(12) United States Patent
Lintulampi

(10) Patent No.: US 6,901,060 B1
(45) Date of Patent: May 31, 2005

(54) METHOD AND APPARATUS FOR MULTIPLEXING A PLURALITY OF DATA CONNECTIONS ONTO ONE TEMPORARY BLOCK FLOW

(75) Inventor: Raino Lintulampi, Kiviniemi (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/573,105

(22) Filed: May 17, 2000

(51) Int. Cl.[7] ................................................ H04Q 7/00
(52) U.S. Cl. ...................... 370/329; 370/338; 370/348; 370/352; 370/469; 455/452.2
(58) Field of Search ................................ 370/329, 338, 370/348, 352, 465, 469, 314, 332, 331, 349, 335, 341, 353, 392, 401, 466, 470, 471, 474, 395.1; 455/452.2, 426, 448, 450, 452, 509, 511, 517

(56) References Cited

U.S. PATENT DOCUMENTS 6,363,058 B1 * 3/2002 Roobol et al. ............... 370/310
6,374,112 B1 * 4/2002 Widegren et al. ......... 455/452.2
6,434,133 B1 * 8/2002 Hamalainen ................ 370/338
6,463,055 B1 * 10/2002 Lupien et al. .............. 370/353
6,553,006 B1 * 4/2003 Kalliokulju et al. ........ 370/310

FOREIGN PATENT DOCUMENTS

| EP | 0 932 318 A2 | 7/1999 |
| WO | 99/16264 | 4/1999 |
| WO | 99/39528 | 8/1999 |

* cited by examiner

*Primary Examiner*—Dang Ton
*Assistant Examiner*—Inder Pal Mehra
(74) *Attorney, Agent, or Firm*—Harrington & Smith, LLP

(57) ABSTRACT

A method and an apparatus are described for sending packet data over a wireless link. The method includes sequentially multiplexing a plurality of radio bearers onto one Temporary Block Flow (TBF) by performing, for a first radio bearer, transmitting the first radio bearer identity to a receiver in at least one first Radio Link Control (RLC) block of a Temporary Block Flow (TBF); upon an occurrence of a change from the first radio bearer to a second radio bearer, transmitting the second radio bearer identity to the receiver in at least one subsequent Radio Link Control (RLC) block of the same TBF; and, at the receiver, sequentially demultiplexing the plurality of radio bearers from the one Temporary Block Flow (TBF) by first detecting the presence of the radio bearer identities in received RLC blocks.

5 Claims, 8 Drawing Sheets

GPRS UPLINK RLC DATA BLOCK WITH MAC HEADER

EGPRS UPLINK RLC DATA BLOCK

FIG. 7C

UPLINK RLC DATA BLOCK HEADER FOR MCS-7, MCS-8 AND MSC-9.

| Bit 8 | 7 | 6 | 5 | 4 | 3 | 2 | 1 |
|---|---|---|---|---|---|---|---|
| TFI | | COUNTDOWN VALUE | | | | SI | R |
| BSN1 | | | | | TFI | | |
| BSN2 | | BSN1 | | | | | |
| BSN2 | | | | | | | |
| SPARE | | RSB | CPS | | | | |
| SPARE | | | | | | | PI |

FIG. 7D

UPLINK RLC DATA BLOCK HEADER FOR MCS-5 AND MSC-6.

| Bit 8 | 7 | 6 | 5 | 4 | 3 | 2 | 1 |
|---|---|---|---|---|---|---|---|
| TFI | | COUNTDOWN VALUE | | | | SI | R |
| BSN1 | | | | TFI | | | |
| CPS | | BSN1 | | | | | |
| SPARE | | | | | | | CPS |
| | | SPARE | | | | | PI |

FIG. 7E

UPLINK RLC DATA BLOCK HEADER FOR MCS-1, MCS-2, MCS-3 AND MSC-4.

| Bit 8 | 7 | 6 | 5 | 4 | 3 | 2 | 1 |
|---|---|---|---|---|---|---|---|
| TFI | | COUNTDOWN VALUE | | | | SI | R |
| BSN1 | | | | TFI | | | |
| CPS | | BSN1 | | | | | |
| | SPARE | PI | RSB | | SPB | CPS | |

METHOD AND APPARATUS FOR MULTIPLEXING A PLURALITY OF DATA CONNECTIONS ONTO ONE TEMPORARY BLOCK FLOW

FIELD OF THE INVENTION

This invention relates generally to method and apparatus for transmitting and receiving packet data over a wireless interface and, more particularly, relates to methods and apparatus for transmitting and receiving packet data between a wireless user terminal and a network operator in a digital cellular telecommunications system.

BACKGROUND OF THE INVENTION

Modern wireless telecommunications systems are evolving to provide high speed packet data services for users of mobile equipment. One example is an ability to provide internet access to a user of mobile equipment. A wireless system that is rapidly evolving in this direction is a Time Division, Multiple Access (TDMA) system known as the Global System for Mobile Communication (GSM), in particular enhanced versions of GSM known as GSM+, GPRS (General Packet Radio Services) and EGPRS (Enhanced General Packet Radio Services).

The GPRS Release '97 was the first standard to provide (limited) packet data services. However, this standard did not provide a capability for the user to control the bit rate(s) and delays for a packet data connection. In the developing Universal Mobile Telecommunication System (UMTS) packet domain permits several packet data connections to be simultaneously maintained, with different qualities of service. Although there have, at present, been two subsequent GPRS releases since the Release '97, the quality of service concept has remained the same.

The Enhanced GPRS (EGPRS) phase 2, which is expected to be the next GPRS release (Release '00), provides a new radio access network to the UMTS core network, and is to adopt the same quality of service attributes as used in the existing UMTS.

A problem thus has arisen, as to how the basic GPRS quality of service provisions can be enhanced to meet the same flexibility requirements that exist in UMTS.

In the UMTS system the data connection between a core network and a mobile station is identified using a Network Service Access Point Identifier (NSAPI), that identifies as well a radio access bearer. In the previous releases of GPRS (pre-Release '00), a connection is identified by NSAPI and a Logical Link Control (LLC) protocol SAPI. However, in UMTS, and thus in GPRS Release '00, the LLC protocol is no longer used.

More specifically, in the UMTS a data connection between a mobile station (MS), such as a cellular telephone, and the third generation (3G) Serving GPRS Support Node (SGSN), or 3G-SGSN, is identified using the Network Service Access Point Identifier (NSAPI) with which the requested quality of service parameters are associated. The data connection is realized by a radio access bearer established by the 3G-SGSN to the radio access network. The radio access bearer identity is the same as the NSAPI. In the radio interface the radio access bearer is realized by one or several radio bearers, each having their own identities. During the radio bearer set-up phase the NSAPI is associated with radio bearers and the radio bearers are associated with a channel. As such, in the UMTS radio access network the channel number/identifier unambiguously identifies the data connection and its quality of service parameters and, hence, there is no need to carry either the NSAPI or radio bearer identity in protocol headers.

However, in GPRS Release '00 there is no provision to associate a data connection to a (physical) channel. As such, one problem that arises is how to identify a data connection in the radio interface.

A second issue relates to improving the flexibility of the GPRS Radio Link Control/Media Access Control (RLC/MAC) layer. An important distinction between the basic GPRS and the UMTS Radio Access Network (URAN) is that the GPRS MAC multiplexes Logical Link (LL) Protocol Data Units (PDUs), while UMTS multiplexes transport (Radio Link Control or RLC) blocks. In general, GPRS multiplexing is inflexible, and is not suitable for connections having different quality of service requirements. For example, whatever the size of the LL PDU from SAPI 5 in FIG. 2 (the maximum length is 1520 octets), it must be entirely sent before the layer 3 message from SAPI 1 can be sent. If the RLC mode used by SAPI 5 is different than the one used for signalling, then the current Temporary Block Flow (TBF) must be released, and a new TBF established before the layer 3 message can be sent. Before sending a new LL PDU, a Packet Resource Request message must be sent to the network to indicate the characteristics (radio priority, peak throughput class, RLC mode) of the new LL PDU.

In EGPRS the same access types as in GPRS are supported to establish the Temporary Block Flow (TBF) in the uplink direction (i.e., from the mobile equipment to the network).

To accomplish this, a control message used by a GPRS mobile equipment to request a packet channel (Packet Channel Request, 11 bits) is re-used for EGPRS.

To summarize, in GPRS '97 a data connection is identified by the NSAPI carried in a SNDCP (Subnetwork Dependent Convergence Protocol) header and by a LLC SAPI carried in a LLC protocol header. However, in GPRS Release '00 the SNDCP is replaced with Packet Data Convergence Protocol (PDCP) that does not have NSAPI in a protocol header, and the LLC protocol is removed. As such, the GPRS Release '97 type of identification cannot be directly used, while in UMTS the NSAPI is not required to be carried in the protocol header, as the NSAPI/radio bearer/channel mapping is done unambiguously.

With regard to multiplexing in UMTS, there are two levels of data multiplexing. First, the MAC multiplexes logical channels onto the transport channel. The basic multiplexing unit is a PDCP PDU, hence MAC multiplexing has the same properties as the LLC PDU multiplexing in a GPRS RLC. For example, and referring to FIG. 3, if radio bearer x has a higher priority than radio bearer y, and if they are multiplexed onto the same transport channel (Dedicated Transport Channel or DCH) 2, then a Packet Data Convergence Protocol (PDCP) Protocol Data Unit (PDU) from the radio bearer x cannot be sent before a previous PDCP PDU from the radio bearer y has been sent. Transport channels are connected to a layer 1 coding and multiplexing unit that processes and multiplexes several dedicated transport channels into a coded composite transport channel (CCTrCH). Bits from the CCTrCH can be mapped on the same physical channel, as shown in FIG. 3. The only restriction is that transport channels should have the same Carrier to Interference (C/I) requirement, therefore both speech and data cannot be mapped onto the same physical channel. Each transport channel has its own transport format set. On the physical channel all combinations of transport formats cannot be supported, but only a subset that is defined in the transport format combination set. When mapping data onto a physical channel, MAC chooses between the different transport format combinations given in the transport format combination set. This selection is performed rapidly and utilizes a flexible variable bit rate scheme for the physical layer without requiring additional signalling. If, in FIG. 3, radio bearers x and y are mapped on the different transport channels DCH2 and DCH3, then RLC PDUs from DCH2 can be sent at the same time, or before, RLC PDUs from DCH3, depending on the transport format combination that the MAC transfers to layer 1. However, the total bit rate of the different transport channels cannot exceed at any time the maximum bit rate set of the CCTrCH.

In summary, with the known techniques a data connection is implicitly associated with a Radio Link Control (RLC) Temporary Block Flow (TBF).

To overcome these problems, it has been previously proposed to allow more than one Temporary Block Flow (TBF) to simultaneously exist. However, for several reasons this approach is not optimum.

OBJECTS AND ADVANTAGES OF THE INVENTION

It is a first object and advantage of this invention to provide a method and apparatus for multiplexing a plurality of data connections, in a flexible manner, into one Radio Link Control (RLC) Temporary Block Flow (TBF).

It is another object and advantage of this invention to employ radio bearer identities to make fast packet channel resource requests.

SUMMARY OF THE INVENTION

The foregoing and other problems are overcome and the objects of the invention are realized by methods and apparatus in accordance with embodiments of this invention.

As was made evident above, in UMTS the data connection is identified using the Network Service Access Point Identifier (NSAPI), that also identifies a radio access bearer. In the previous releases of GPRS (pre-Release '00), a connection is identified by NSAPI and a Logical Link Control (LLC) protocol SAPI. However, in UMTS, and thus in GPRS Release '00, the LLC protocol is no longer used. As such, either the NSAPI or the UMTS radio bearer needs to be associated with a GPRS RLC TBF in order to identify a data connection in the radio interface.

This invention provides a method and apparatus for multiplexing a plurality of radio bearers onto one TBF by utilizing radio bearer identities in the GPRS radio interface. This method and apparatus also provide the benefit of enabling a rapid channel allocation request to occur.

The method unambiguously maps the Network Service Access Point Identifier (NSAPI), and thus the quality of service parameters, to radio bearer identities, and uses a radio bearer identity only once for one mobile station. That is, the same numeric value of the radio bearer identity is not associated with two NSAPIs in the same mobile station. In this method, a radio bearer identity is carried in the Radio Link Control (RLC) block, at the beginning of a Temporary Block Flow (TBF), and every time a radio bearer is changed. A changed radio bearer identity also functions as a new channel request, if the quality of service requirements of a new radio bearer are different than the quality of service requirements of the previous radio bearer. Furthermore, a radio bearer identity is conveyed in an RLC acknowledgement message from the receiver to the transmitter or sender of the packet data.

The method thus provides for a radio bearer identity, or RB_id, to be carried in each RLC data block, or at the beginning of the TBF. This can be accomplished, in a preferred embodiment of this invention, utilizing packet flow identifier bits first introduced for GPRS Release '99.

A method is herein disclosed for sending packet data over a wireless link. The method includes steps of sequentially multiplexing a plurality of radio bearers onto one Temporary Block Flow (TBF) by performing, for a first radio bearer, a step of transmitting the first radio bearer identity to a receiver in at least one first Radio Link Control (RLC) block of a Temporary Block Flow (TBF); upon an occurrence of a change from the first radio bearer to a second radio bearer, transmitting the second radio bearer identity to the receiver in at least one subsequent Radio Link Control (RLC) block of the same TBF; and, at the receiver, sequentially demultiplexing the plurality of radio bearers from the one Temporary Block Flow (TBF) by first detecting the presence of the radio bearer identities in received RLC blocks.

An initial step of the method maps a Network Service Access Point Identifier (NSAPI), and thus quality of service parameters, to the radio bearer identities.

A further step transmits from the receiver, in response to receiving the second radio bearer identity and if quality of service parameters of the second radio bearer require a new channel allocation, a Packet Uplink Assignment message (or some other suitable channel assignment message) to the transmitter. Alternatively, if quality of service parameters of the second radio bearer do not require a new channel allocation, an acknowledgement of the receipt of a first received RLC block from the second radio bearer is transmitted to the transmitter.

In the presently preferred, but not limiting, GPRS embodiment, the radio bearer identity is preferably contained within packet flow identifier (PFI) bits, and the presence of the radio bearer identity within the PFI bits is indicated by using a PFI Indicator (PI) bit.

A further step of the method is executed upon an occurrence of a change from the second radio bearer to the first or to another radio bearer, by transmitting the radio bearer identity of the first radio bearer or the other radio bearer to the receiver in another subsequent Radio Link Control (RLC) block of the same TBF. The receiver may then perform a step of acknowledging the receipt of the another subsequent Radio Link Control (RLC) block by transmitting a Packet Uplink Ack message or a Packet Downlink Ack message from the receiver to the transmitter.

Note should thus be made of the fact that the teachings of this invention apply as well to the downlink, although in the downlink direction the channel allocation procedure does not differ from the current allocation procedure. However, the change in radio bearer is preferably acknowledged using a Packet Downlink Acknowledgement message from the mobile station to the network.

BRIEF DESCRIPTION OF THE DRAWINGS

The above set forth and other features of the invention are made more apparent in the ensuing Detailed Description of the Invention when read in conjunction with the attached Drawings, wherein:

FIGS. 7A–7E depict formats for various uplink RLC data blocks.

DETAILED DESCRIPTION OF THE INVENTION

In order to improve the multiplexing capabilities of the GPRS Radio Link Control (RLC), Media Access Control (MAC) layer, the Network Service Access Point Identifier (NSAPI) must be able to be identified within a RLC block. As such, the NSAPI is associated with the radio bearer identity. This association is performed using a radio resource control protocol between the network and the mobile station.

Figure 4:
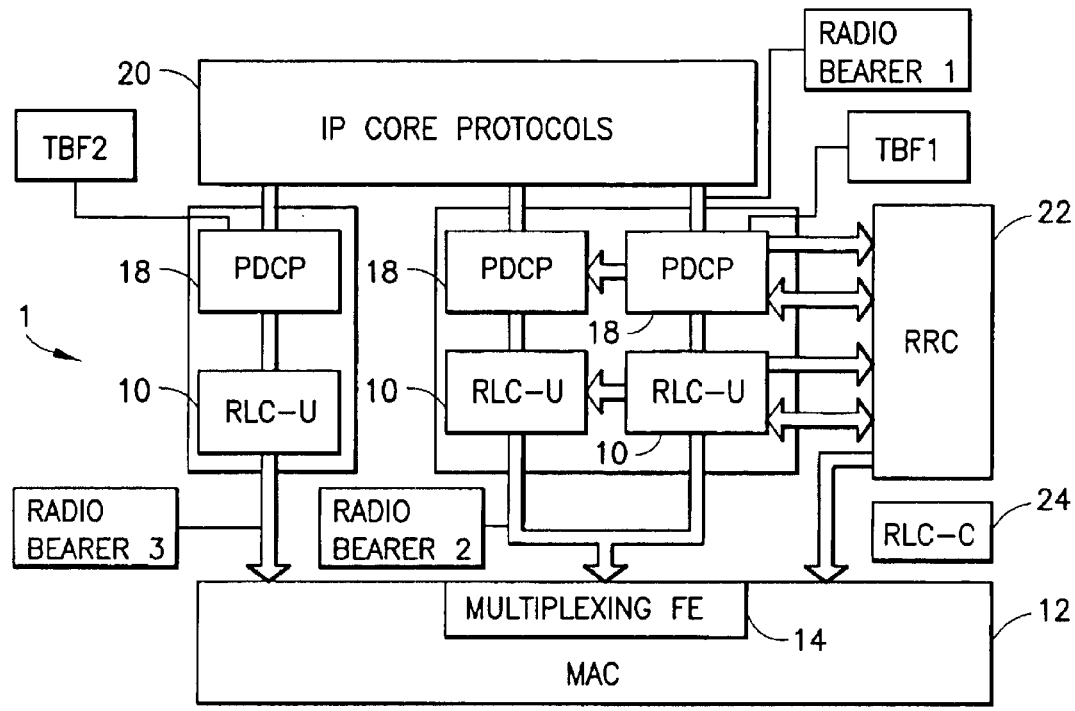
FIG. 4 is a logical block diagram depicting the mapping or multiplexing of two radio bearers onto the same Temporary Block Flow (TBF) at a transmitter.

Referring to FIG. 4, for each radio bearer there is an RLC entity 10 that manages control functions, such as segmentation, reassembly and acknowledgements, that are related to the radio bearer. The MAC 12 is provided with a multiplexing functional element (FE) 14 that multiplexes different radio bearers onto the same TBF. In the transmitter 1, or sending side, the multiplexing FE 14 adds a radio bearer identification (RB_id) to each RLC block, or to the first RLC block of a TBF. If only one radio bearer is currently in use, then the RB_id is only added to the first RLC of the TBF. The multiplexing FE 14 multiplexes RLC Protocol Data Units (PDUs) from different radio bearers onto the TBF depending on the priorities of the radio bearers or, more generally, depending on the quality of service attributes of the radio bearers. Also shown in FIG. 4, associated with each RLC 10, are respective Packet Data Convergence Protocol (PDCP) units 18, IP core protocols 20, Radio Resource Control (RRC) unit 22, and a Radio Link Control for control plane (RLC-C) unit 24.

Figure 5:
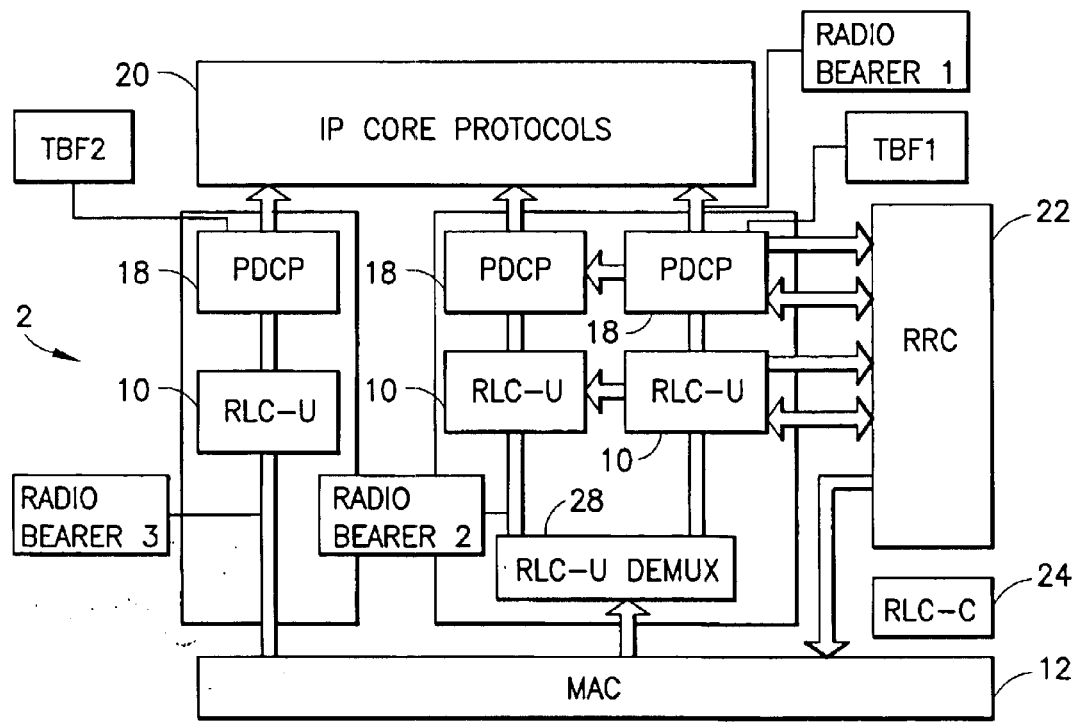
FIG. 5 is a logical block diagram depicting the demultiplexing of two radio bearers from the same Temporary Block Flow (TBF), using radio bearer identity (RB_id), at a receiver.

At the receiver 2, or receiving side, depicted in FIG. 5 the different radio bearers are demultiplexed by a demultiplexing Radio Link Control unit 28, using the received radio bearer identities (RB_ids). The RB_id can be defined using Packet Flow Identifier (PFI) bits, and the presence of the radio bearer identity may be indicated using the PFI Indicator (PI) bit. The RB identity fields define the radio bearer that the RLC block is associated with. If a RB_id is not present in the RLC data block, the RLC-U (RLC user plane part) demultiplexer block 30 assumes that all RLC blocks within the TBF belong to the previous radio bearer that was identified by the RB_id.

In the EGPRS case the radio bearer identity can also be defined using packet flow identifier (PFI) bits, and the presence of the radio bearer identity may be indicated using the PFI Indicator (PI) bit.

Figure 7A:
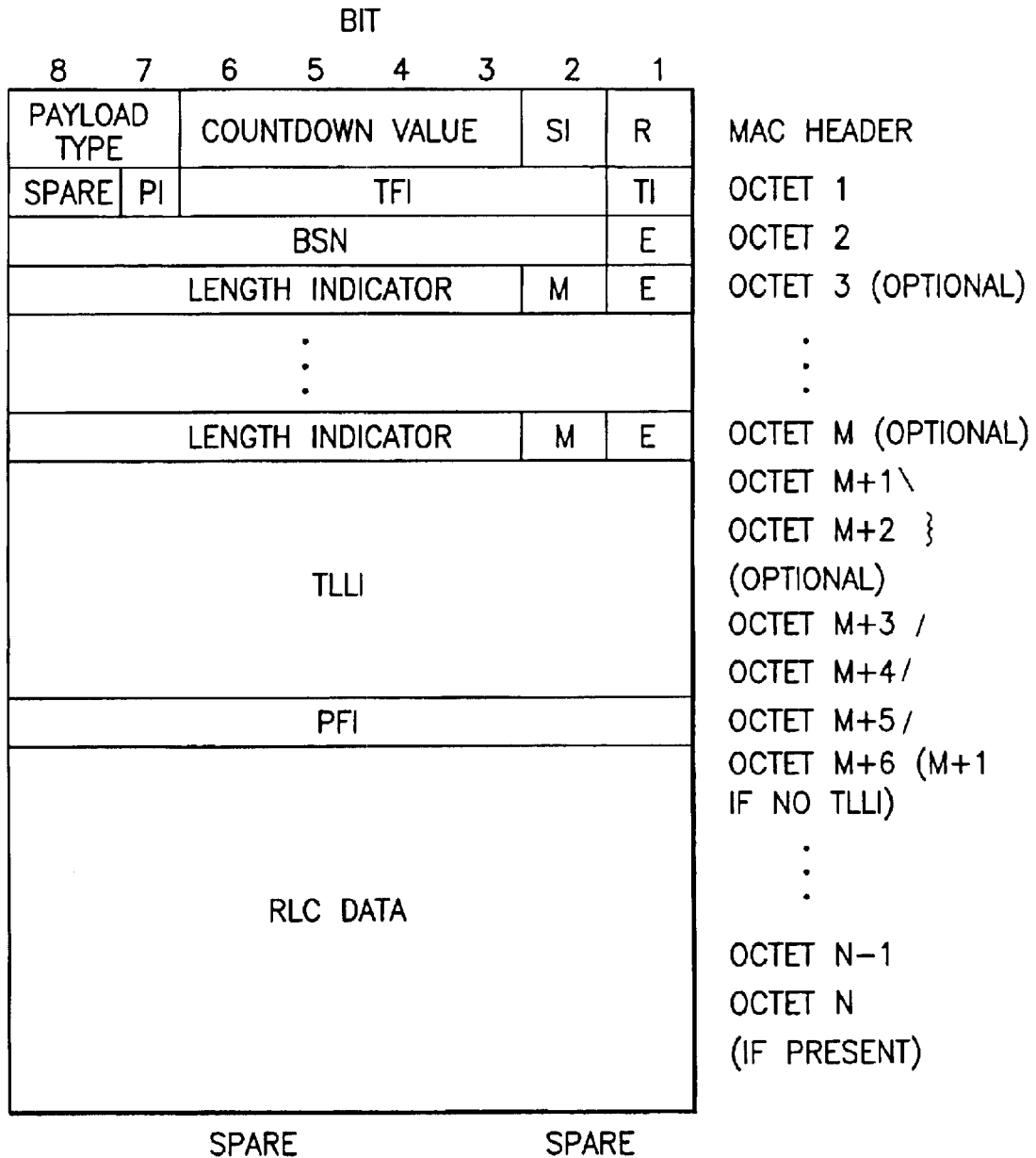
Figure 7B:
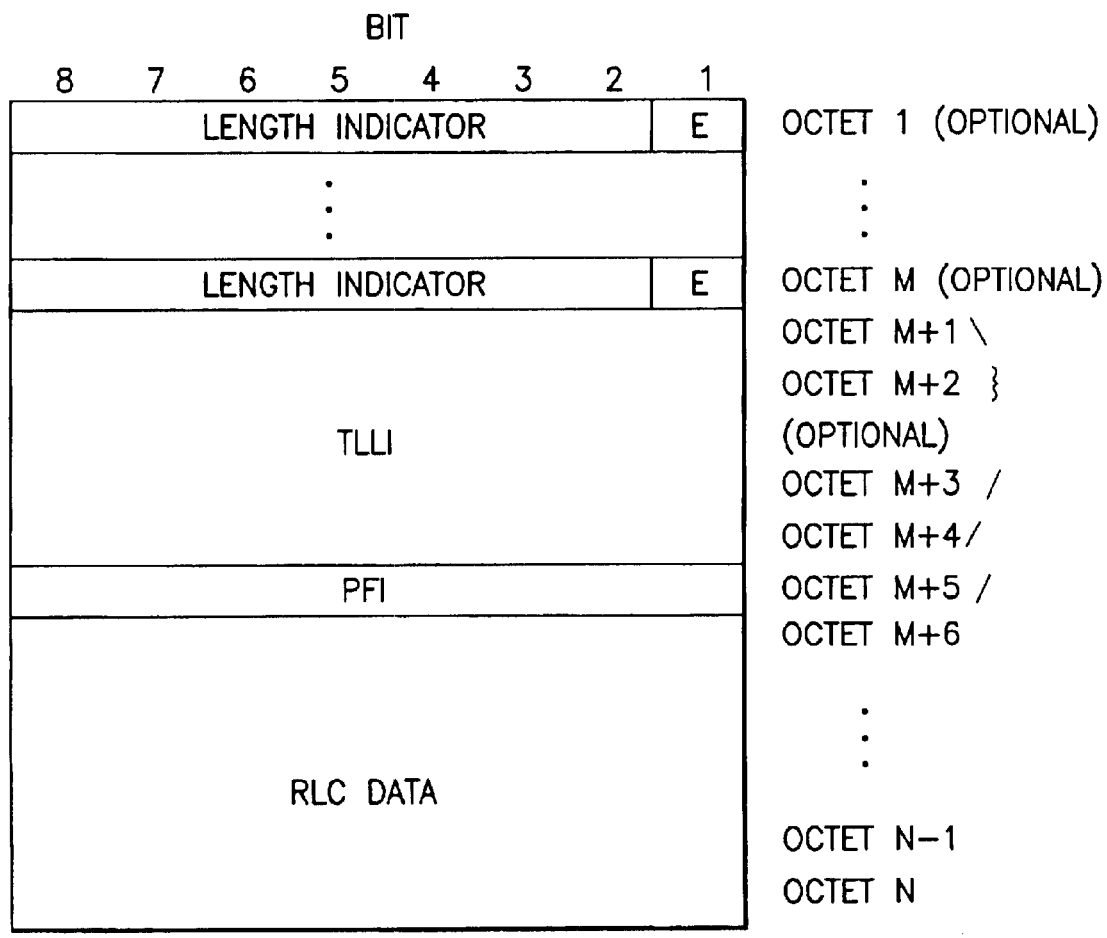

FIGS. 7A–7E depict various uplink RLC data block formats showing locations of PFI and PI bit fields. A similar scheme for coding RB_id in the downlink may be employed. In FIGS. 7C, 7D and 7E the abbreviation "MCS" stands for Modulation and Coding Scheme.

Since there is an RLC entity for each radio bearer the acknowledgement messages are also modified from those originally defined in GPRS '97. A radio bearer to which a particular acknowledgement is associated may be defined using an Extension Bits information element in a Packet Downlink Ack/Nack message and in a Packet Uplink Ack/Nack message.

Figure 6:
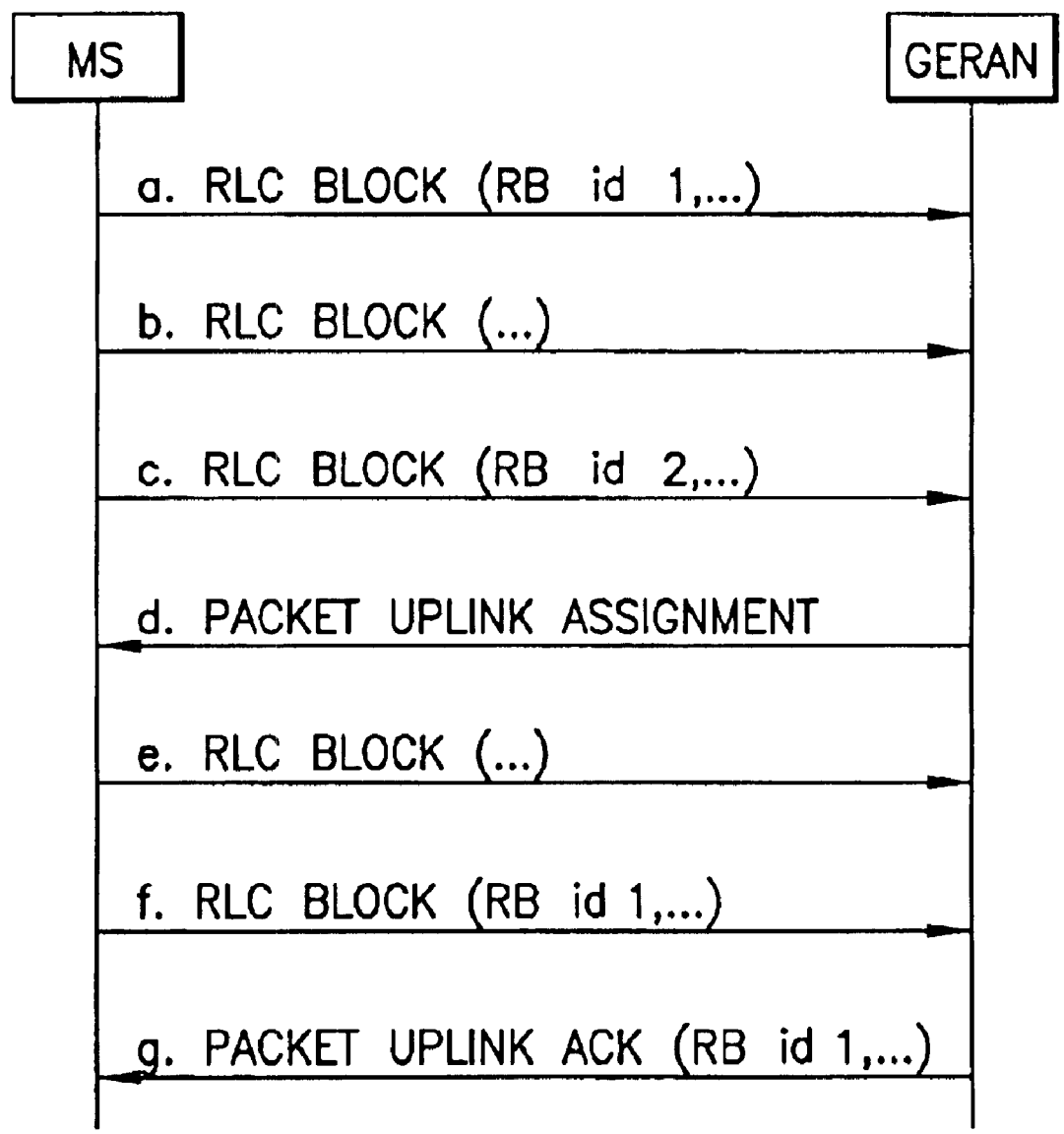
FIG. 6 shows a method of using radio bearer identities to make fast packet channel resource requests.

FIG. 6 illustrates a method showing how radio bearer identities can be used to make fast packet channel resource requests. At Step A a first RLC block is sent in a TBF. In this case the RLC block belongs to radio bearer 1. In the following RLC blocks (Step B) the radio bearer identity is not included, until an RLC block from another radio bearer is required to be sent (Step C). In order to avoid a malfunction in the acknowledgements, the network acknowledges the change in the radio bearer. In Step D the quality of service parameters of radio bearer 2 are assumed to require a new channel allocation, hence a Packet Uplink Assignment message confirms to the sender that the radio bearer has been successfully changed. If a new channel allocation is not required, then the network instead acknowledges the first received RLC block from the new radio bearer (radio bearer 2). In Step E an RLC block from radio bearer 2 is transmitted, and no RB_id is required to be included. In Step F the radio bearer is again changed (to radio bearer 1), and this time the network confirms the change by immediately acknowledging the first received RLC block from radio bearer 1.

Figure 1:
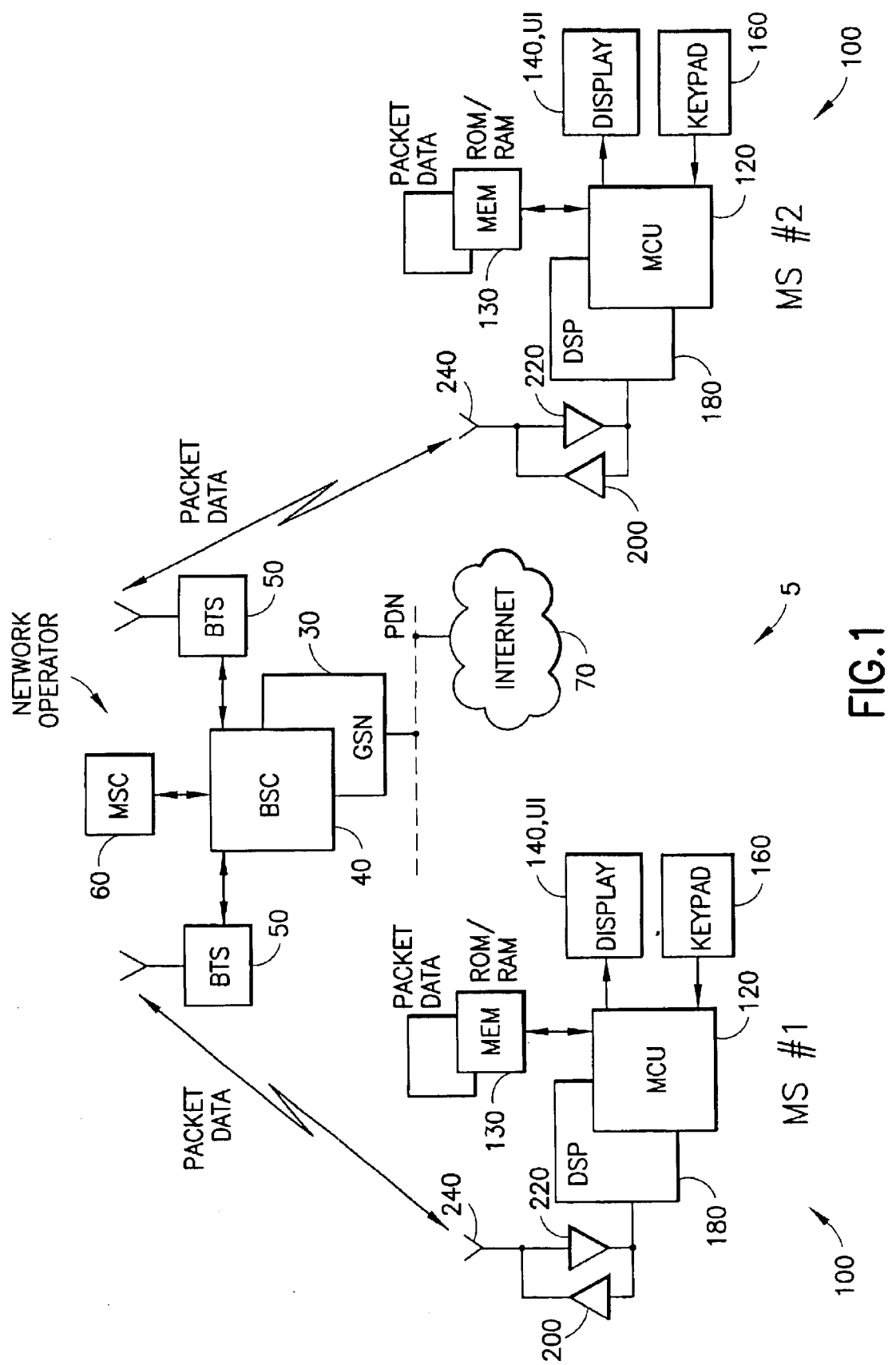
FIG. 1 is a simplified block diagram of telecommunications system that is suitable for practicing this invention.
Figure 2:
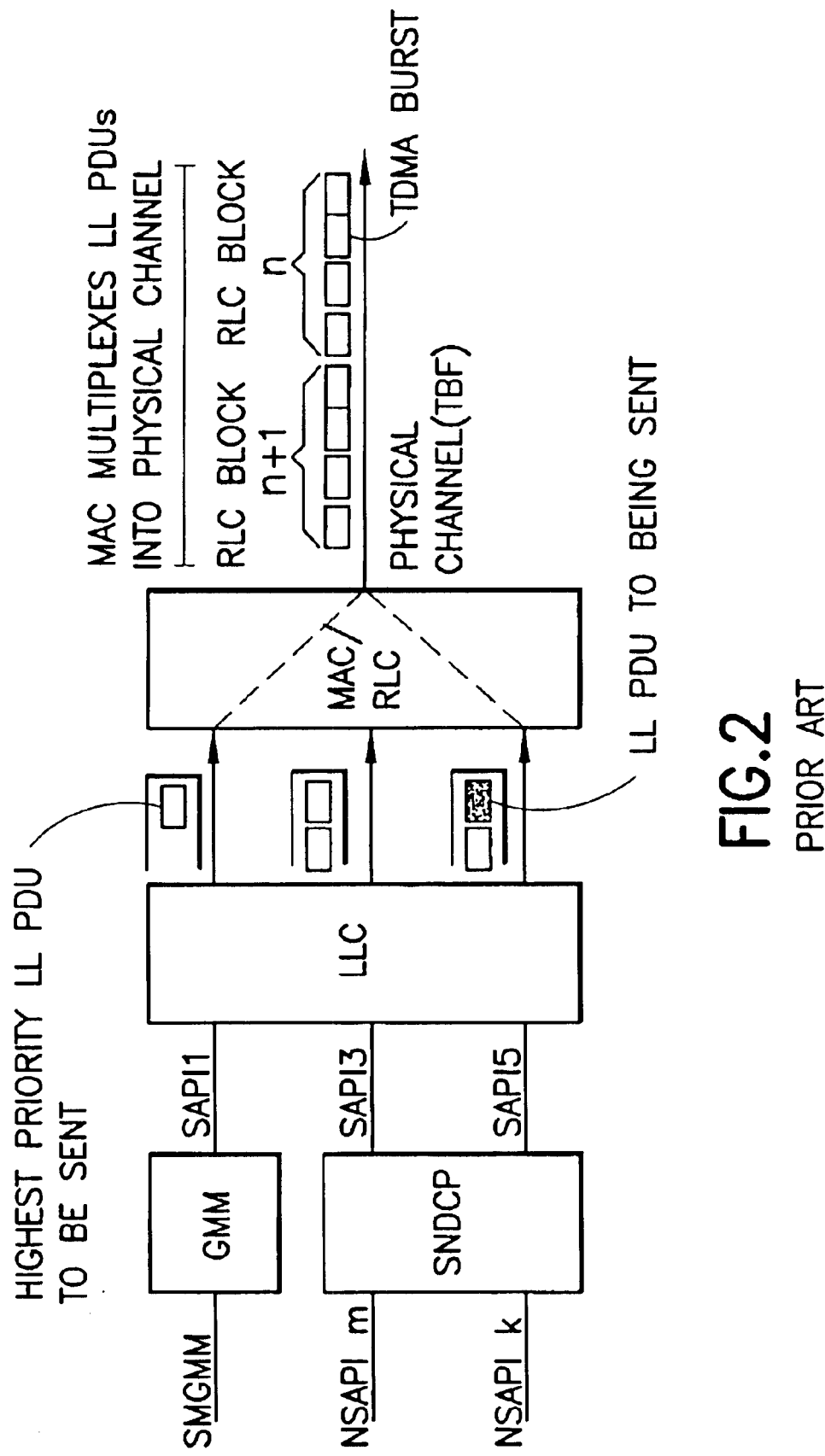
FIG. 2 illustrates a conventional GPRS multiplexing principle, where GMM is a GPRS Mobility Management protocol.
Figure 3:
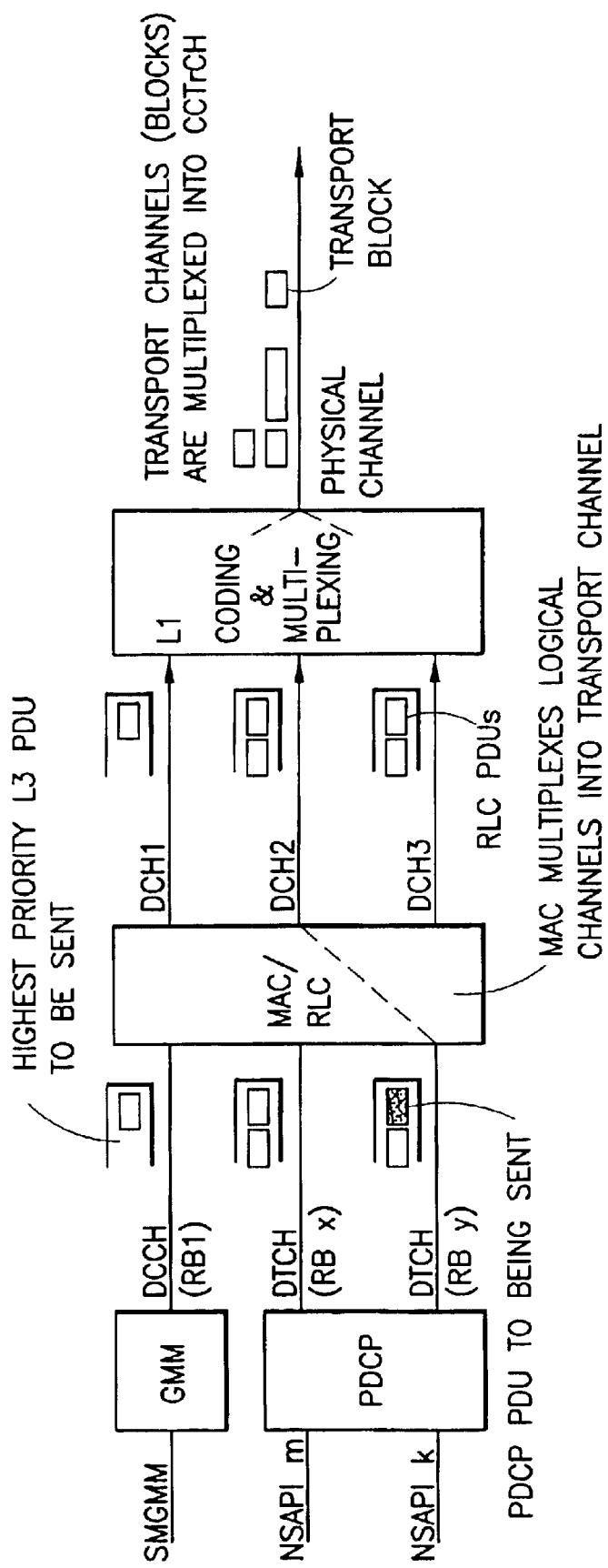
FIG. 3 illustrates a conventional UMTS multiplexing principle.

Referring to FIG. 1, there is illustrated a simplified block diagram of an embodiment of a wireless communications system 5, suitable for practicing this invention, that includes a plurality of mobile stations 100. Two mobile stations (MSs) are shown in FIG. 1, with one being designated MS#1 and the other MS#2. FIG. 1 also shows an exemplary network operator having, for example, a GPRS Support Node (GSN) 30 for connecting to a telecommunications network, such as the Public Packet Data Network or PDN, at least one base station controller (BSC) 40, and a plurality of base transceiver stations (BTS) 50 that transmit in a forward or downlink direction both physical and logical channels to the mobile stations 100 in accordance with a predetermined air interface standard. A reverse or uplink communication path also exists from the mobile station 100 to the network operator, which conveys mobile originated access requests and traffic, including the RLC data blocks in accordance with the teachings herein.

In a preferred, but not limiting, embodiment of these teachings, the air interface standard can conform to any standard that enables packet data transmissions to occur with the mobile stations 100, such as Internet 70 access and web page downloads. In the presently preferred embodiment of this invention the air interface standard is a Time Division Multiple Access (TDMA) air interface that supports the enhanced GPRS capabilities disclosed herein.

The network operator may also include a Message Service Center (MSC) 60 that receives and forwards messages for the mobile stations 100, although any wireless messaging technique that is capable of using packet data can be used. Other types of messaging service may include Supplementary Data Services and one under currently development and known as Multimedia Messaging Service (MMS), wherein image messages, video messages, audio messages, text messages, executables and the like, and combinations thereof, can be transferred between a network and a mobile station.

The mobile station 100 typically includes a microcontrol unit (MCU) 120 having an output coupled to an input of a display 140 and an input coupled to an output of a keyboard or keypad 160. The mobile station 100 may be considered to be a handheld radiotelephone, such as a cellular telephone or a personal communicator. The mobile station 100 could also be contained within a card or module that is connected during use to another device. For example, the mobile station 100 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a read-only memory (ROM) for storing an operating program, as well as a random access memory (RAM) for temporarily storing required data, scratchpad memory, received packet data, packet data to be transmitted, and the like. A separate, removable SIM (not shown) can be provided as well, the SIM storing, for example, a preferred Public Land Mobile Network (PLMN) list and other subscriber-related information. The ROM is assumed, for the purposes of this invention, to store a program enabling the MCU 120 to execute the software routines, layers and protocols required to implement the transmission and reception of packet data in accordance with the teachings herein, as well as to provide a suitable user interface (UI), via display 140 and keypad 160, with a user. Although not shown, a microphone and speaker are typically provided for enabling the user to conduct voice calls in a conventional manner.

The mobile station 100 also contains a wireless section that includes a digital signal processor (DSP) 180, or equivalent high speed processor, as well as a wireless transceiver comprised of a transmitter 200 and a receiver 220, both of which are coupled to an antenna 240 for communication with the network operator. Packet data is transmitted and received through the antenna 240, in accordance with the teachings herein.

Based on the foregoing description, it can be appreciated that the inventor has provided a method and apparatus for multiplexing a plurality of radio bearers onto one TBF by utilizing the radio bearer identities (RB_ids) in the GPRS radio interface. The disclosed method and apparatus also provide the benefit of enabling a rapid channel allocation request to occur.

Those skilled in the art may derive various modifications to these techniques, when guided by the teachings herein. For example, it may be desirable to include the RB_id in multiple RLC blocks until the receiving end either acknowledges, or sends a channel allocation. This technique can be employed to improve the overall reliability when changing radio bearers.

Thus, while the invention has been particularly shown and described with respect to preferred embodiments thereof, it will be understood by those skilled in the art that changes in form and details may be made therein without departing from the scope and spirit of the invention.

What is claimed is:

1. Apparatus to transmit packet data, comprising a multiplexer for multiplexing a plurality of radio bearers onto one Temporary Block Flow (TBF), and further comprising, for a first radio bearer, a unit for transmitting an identity of the first radio bearer to a receiver of the packet data in at least one Radio Link Control (RLC) block of a Temporary Block Flow (TBF), said unit being responsive to an occurrence of a change from the first radio bearer to a second radio bearer, for transmitting an identity of the second radio bearer to the receiver in at least one subsequent Radio Link Control (RLC) block of the TBF, wherein said receiver comprises a demultiplexer that is responsive to a receipt of radio bearer identities for demultiplexing RLC blocks from the TBF, and further comprising a unit, responsive to a receipt of the second radio bearer identity, and if quality of service parameters of the second radio bearer do not require a new channel allocation, for sending to the unit for transmitting an acknowledgment of a receipt of a first received RLC block from the second radio bearer.

2. Apparatus as in claim 1, wherein a Network Service Access Point Identifier (NSAPI), and quality of service parameters, are mapped to radio bearer identities.

3. Apparatus as in claim 1, further comprising a unit, responsive to a receipt of the second radio bearer identity, and if quality of service parameters of the second radio bearer require a new channel allocation, for sending a channel assignment message to the transmitter.

4. Apparatus as in claim 3, wherein the channel assignment message comprises a Packet Uplink Assignment message.

5. Apparatus as in claim 1, wherein a radio bearer identity is contained within packet flow identifier (PFI) bits in the RLC data block, and wherein the presence of the bearer identity within the PFI bits is signalled by using a PFI Indicator (PI) bit.

* * * * *

UNITED STATES PATENT AND TRADEMARK OFFICE
CERTIFICATE OF CORRECTION

PATENT NO. : 6,901,060 B1
APPLICATION NO. : 09/573105
DATED : May 31, 2005
INVENTOR(S) : Raino Lintulampi It is certified that error appears in the above-identified patent and that said Letters Patent is hereby corrected as shown below:

In Claim 5: Column 8, line 43, -- radio -- should be inserted between "the bearer"

Signed and Sealed this

Eleventh Day of September, 2007

JON W. DUDAS
*Director of the United States Patent and Trademark Office*

UNITED STATES PATENT AND TRADEMARK OFFICE
CERTIFICATE OF CORRECTION

PATENT NO. : 6,901,060 B1  Page 1 of 1
APPLICATION NO. : 09/573105
DATED : May 31, 2005
INVENTOR(S) : Raino Lintulampi It is certified that error appears in the above-identified patent and that said Letters Patent is hereby corrected as shown below:

In Claim 5: Column 8, line 43, -- radio -- should be inserted between "the bearer"

Signed and Sealed this

Eighteenth Day of September, 2007

JON W. DUDAS
*Director of the United States Patent and Trademark Office*